Patented Mar. 11, 1947

2,417,147

UNITED STATES PATENT OFFICE 2,417,147

TREATMENT OF THE SURFACE OF GLASS TO REDUCE THE PROPORTION OF INCIDENT LIGHT REFLECTED THEREBY

Arthur Roland Wood, St. Helens, England, assignor to Pilkington Brothers Limited, Liverpool, England, a British company No Drawing. Application April 18, 1944, Serial No. 531,638. In Great Britain June 21, 1943

5 Claims. (Cl. 117—124)

This invention relates to processes of coating the surface of glass with a siliceous layer to reduce the proportion of incident light reflected from the surface, and has for its main object to provide an improved treatment, simple and cheap to perform on a large glass surface, which treatment can be precisely adjusted, and which produces a uniform result over the surface treated.

According to the present invention, a process of coating a glass surface with a siliceous layer to reduce the proportion of incident light reflected from the surface, consists in repeatedly wetting the surface with a solution of silicon tetrachloride in a volatile non-aqueous solvent, exposing each coating as produced to the atmosphere until it is dry, and rubbing each dried coating until it is bright, before commencing the next wetting operation.

Each dried coating is dull, and the rubbing must be carried on until the dullness entirely disappears and the surface is completely bright and is thereby cleaned preparatory to the next wetting operation.

A convenient solvent for the silicon tetrachloride is carbon tetrachloride, and a strength of 1% by volume of the silicon tetrachloride has been found satisfactory.

Weaker solutions may be used, but a larger number of wetting and rubbing operations are then required. Stronger solutions may be used, but are unpleasant in use.

Instead of silicon tetrachloride, there may be used silicochloroform or silicon tetrabromide. The solution of the bromine compound may be more concentrated.

Preferably the wetting of the glass surface is carried out by dipping the glass edgewise into the solution so that both faces are wetted simultaneously.

The atmosphere to which the wetted surface is exposed may be that of the place in which the treatment is carried out.

The number of wetting and drying operations required to achieve the best results, it is believed, depends upon the composition of the glass under treatment, the strength of the solution and on atmospheric conditions. There is, however, an optimum condition, and continued treatment after this condition has been reached causes the reflective power of the surface to increase instead of diminish. As the glass surface is successively wetted and dried, so its faint colour changes and it has been found that in the case of ordinary window glass the optimum condition has been reached when the colour has become purple.

In order that the invention may be more completely understood one example of a process according thereto will now be described in which the process is applied to a commercial window glass, which, generally speaking, contains about 72% silica and has a refractive index about 1.52.

In carrying out this process the glass to be coated is first thoroughly cleaned and allowed to take up the ambient temperature.

After the glass has been cleaned and has reached the atmospheric temperature, at which the treatment is to be performed, it is dipped edgewise in a solution of silicon tetrachloride in carbon tetrachloride, the strength of the solution being about 1% by volume of the silicon tetrachloride. The silicon tetrachloride employed is of the standard quality sold on the market and known as "technical."

The glass is dipped into the solution and taken out again immediately without any pause, and is then exposed to the atmospheric air until the surface is dry. When dry the surface is rubbed until a bright surface is obtained. The surface sometimes has a dull appearance, and this dullness is completely removed by rubbing the surface with a cloth. Sometimes the surface has an almost greasy appearance and in this case vigorous rubbing is necessary, since the surface must be made completely clean and bright before the glass is again dipped.

When the surface has been rendered completely clean and bright the glass is then again dipped into the treating solution and immediately removed, after which it is once more allowed to dry in the atmosphere. After drying the second time the surface is again rubbed with a cloth until it is clean and bright and the successive steps of wetting, drying and rubbing are repeated until the reflective power of the surface has reached its minimum value.

After the third dip the surface of the glass is seen to have become brownish. With further dips the colour deepens and merges into purple. Usually, after 7 or 8 dips the colour has changed completely to purple, which experiment shows to be the colour indicating the optimum condition, namely, the condition in which the reflective power is a minimum.

If the treatment is continued after the colour has changed to purple, the reflective power steadily increases, the colour changing first to blue—then to blue-green—and yellow-green.

By the treatment described the quantity of light reflected by window glass which is untreated can be reduced by about 50%, the amount of light reflected by each treated surface of window glass being about 2%.

The rubbing of the glass between successive dips is most important, since without it the smooth surface of the glass becomes completely destroyed.

After the final dip the surface is rubbed until it becomes bright and it is then washed, for example with water or alcohol.

In the case of lead glasses containing up to 65% PbO and about 30% silica of refractive index about 1.7, very large reductions in reflection have been obtained, the amount of light reflected by each treated surface being about 1%. In general the lead glasses require rather less treatment than the commercial window glass, only 6 dips being required for the lead glass compared with 8 dips for the window glass.

For lead glass the colour indicating the attainment of the optimum condition is a deep bronze purple.

It will be understood that the method according to the invention of reducing the reflective power of the glass surface by dipping it in the solution is particularly advantageous since relatively large sheets of glass can be easily and economically treated.

The present invention also consists in a method of accelerating the formation of the dry coating, under conditions of normal humidity, wherein a volatile substance readily miscible with the treating solution is incorporated in it, whereby the moisture necessary to produce the desired reaction with the silicon tetrachloride, or silicochloroform or silicon tetrabromide, employed, is quickly made available to the coating.

To this end a ketone, e. g., methyl ethyl ketone but particularly acetone, may be embodied in the solution provided small quantities only are admixed, the function of the ketone being that of a reservoir of very small quantities of moisture which become available on the glass surface to initiate or assist in the development of the coating.

Experiments have shown that an acceleration of the formation of the coating can be achieved by adding a quantity of acetone equivalent to 2% by volume of the carbon tetrachloride, and still better results are obtained if the acetone content represents 3–5% by volume of the carbon tetrachloride herein employed. Care, however, should be taken to avoid greatly increasing the percentage employed because experiments have also shown that an excess amount of acetone causes fogging and that with 10% the action of the solution is almost completely inhibited.

In very dry atmospheres the incorporation of acetone shows a marked increase in the speed of development of the film, but excellent results over a wide range of humidities is obtained by employing a treating solution having the following formula:

Carbon tetrachloride 100 parts by volume; acetone 3 parts; silicon tetrachloride one to two parts.

Not only is the employment of acetone a means of accelerating the development of the film, but it is also found that the number of dips can be reduced as compared with the number required when acetone is not employed. Excellent results have been obtained by employing only six dips for the treatment of glass which, except for the inclusion of the acetone, would require seven or eight dips.

From another aspect it will be observed that the invention may be expressed as consisting in a method of increasing the proportion of incident light transmitted by the glass surface, by forming a surface layer on the glass by wetting the surface with a solution of silicon tetrachloride in carbon tetrachloride, in which solution is incorporated a small portion (up to 5%) of acetone, exposing the coating to the atmosphere and then rubbing the coating when dry until it is bright and repeating the treatment until a purple hue is observed in the coating.

An advantage arising out of employing the present invention on glasses having a low silica content, is that these glasses generally are susceptible to decomposition of the surface when exposed to moist atmosphere, but when treated according to the present invention the coating produced is found substantially to increase the resistance of the glass to the effects of moist atmosphere.

The invention not only comprises the processes described of reducing the amount of incident light reflected from glass and increasing the amount of light transmitted by glass, but also consists in the treated product.

I claim:

1. Process of coating a glass surface with a siliceous layer to reduce the proportion of incident light reflected from the surface, consisting in forming a built up layer on the glass by repeatedly wetting the surface with a solution of one of the halogen derivatives of silica of the group consisting of silicon tetrachloride, silicochloroform and silicon tetrabromide, in a volatile non-aqueous solvent, exposing each coating as produced to the atmosphere until it is dry, and rubbing each dried coating until it is bright, before commencing the next wetting operation.

2. Process of coating a glass surface with a siliceous layer to reduce the proportion of incident light reflected from the surface, consisting in forming a built up layer on the glass by repeatedly wetting the surface with a solution of silicon tetrachloride in carbon tetrachloride having the strength of 1% by volume of silicon tetrachloride, exposing each coating as produced to the atmosphere until it is dry, and rubbing each dried coating until it is bright, before commencing the next wetting operation.

3. Process of coating a glass surface with a siliceous layer to reduce the proportion of incident light reflected from the surface, consisting in forming a built up layer on the glass by repeatedly wetting the surface with a solution of one of the halogen derivatives of silica of the group consisting of silicon tetrachloride, silicochloroform and silicon tetrabromide, in a volatile non-aqueous solvent, said wetting solution comprising a small quantity of a volatile ketone whereby some of the moisture necessary to produce the desired reaction with the silicon reagent is quickly made available to the coating on the surface of the glass, exposing each coating as produced to the atmosphere until it is dry, and rubbing each dried coating until it is bright, before commencing the next wetting operation.

4. A process of coating glass according to claim 3, wherein the wetting solution contains up to 5% of acetone.

5. A process of coating a glass surface with a siliceous layer to reduce the proportion of incident light reflected from the surface and to increase the proportion of incident light transmitted by the glass surface, consisting in forming a surface layer on the glass by wetting the surface with a solution of silicon tetrachloride in carbon tetrachloride, the solution having a strength of 1% by volume of silicon tetrachloride, and having incorporated in the wetting solution 3% of acetone, exposing the coating as produced to the atmosphere and then rubbing the coating when dry until it is bright and repeating the treatment alternately wetting and then drying and so rubbing the coating until a purple hue is observed in the coating.

ARTHUR ROLAND WOOD.

REFERENCES CITED

The following references are of record in the file of this patent:

UNITED STATES PATENTS

| Number | Name | Date |
| --- | --- | --- |
| 2,348,704 | Adams | May 16, 1944 |
| 2,220,862 | Blodgett | Nov. 5, 1940 |
| 2,194,115 | Ferguson | Mar. 19, 1940 |
| 2,366,516 | Geffcken et al. | Jan. 2, 1945 |

FOREIGN PATENTS

| Number | Country | Date |
| --- | --- | --- |
| 29,561 | British | 1904 |